W. S. BARTLE.

Fertilizer.

No. 558

Reissued May 18, 1858

WITNESSES:

Mathew Cohen

A. Lambridge

INVENTOR:

Warren S. Bartle

N. PETERS, PHOTO-LITHOGRAPHER, WASHINGTON, D. C.

UNITED STATES PATENT OFFICE.

WARREN S. BARTLE, OF NEWARK, ASSIGNOR TO LYMAN BICKFORD AND HENRY HOFFMAN, OF MACEDON, NEW YORK.

IMPROVED MACHINE FOR SOWING FERTILIZERS.

Specification forming part of Letters Patent No. 14,708, dated April 22, 1856; Reissue No. 558, dated May 18, 1858.

*To all whom it may concern:*

Be it known that I, WARREN S. BARTLE, of Newark, in the county of Wayne and State of New York, have invented a new and Improved Machine for Sowing Guano or other Pulverable Fertilizers; and I do hereby declare that the following is a full, clear, and exact description thereof, reference being had to the accompanying drawings, making a part of this specification, in which—

Figure 1:
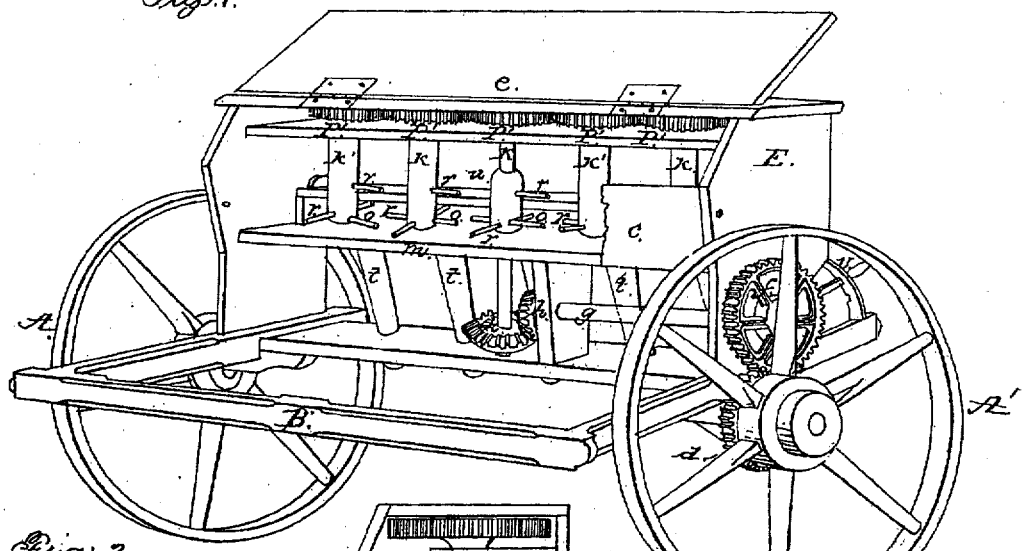
Figure 2:
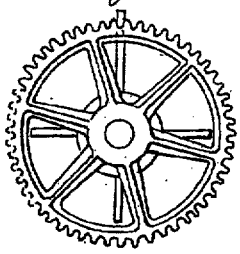
Figure 3:
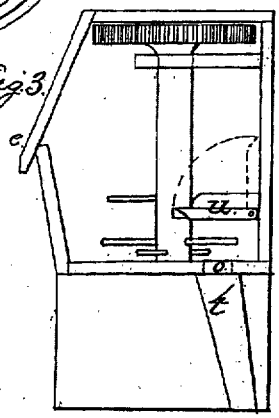

Figure 1 is a perspective view with part of the front of the hopper removed; Fig. 2, a top view of one of the distributers and the toothed wheel through which it is operated; and Fig. 3 is a transverse section of the body of the machine.

The letters of reference indicate the same parts in the different figures.

A and A′ are the wheels which carry the frame B upon which the apparatus for sowing rests.

E is the hopper or supply-box, resting upon the frame B.

*e* is the cover of the hopper. (Shown in Fig. 1 as opened and in Fig. 3 as closed.)

*d* is a toothed wheel, which is secured upon the hub of the wheel A′, concentric with its axis. The wheel *d* meshes into the toothed wheel *f*, which is attached to the shaft *g*, which communicates motion by means of the bevel-gear *h* to the central shaft, *k*, of a series of vertical shafts, *k′*, which are each provided with a pinion, *p* and *p′*, meshing into each other and receiving motion from the central shaft, *k*, when the machine is drawn forward. The power is communicated to the central pinion, *p*, of the series instead of the one nearest to the carrying-wheel, for the purpose of dividing the strain upon the teeth of the pinion *p* and materially relieving the strain upon the teeth of those which would be nearest to the driving-pinion, if that were placed at one end of the series.

I do not confine myself to communicating the power through the medium of the central pinion in all cases, for there may be an even number of pinions, in which case there would strictly be no center one. The communication may be made through any one of the intermediate pinions, and the stress upon the others will be proportionably relieved, but the nearer to the center the greater will be the advantage realized.

To the shafts *k* and *k′* are attached arms *r*, which are made of galvanized-iron or brass wire of about one-fourth of an inch diameter. These are placed at right angles to the axis of the vertical shafts *k* and *k′* and at different heights above the bottom of the hopper *m*. One of the arms, as shown in Fig. 2, is made longer than the others, that it may sweep entirely across the bottom of the box. The arms *r* may be straight, or curved slightly in a direction opposite to or toward that in which they move. The straight form, however, is found best in practice. They perform a threefold function—that of loosening and rendering less compact the material to be sown, that of comminuting it, (particularly guano, which, by reason of its great absorbent qualities, is always more or less moist and adhesive, forming lumps, and in consequence is with difficulty distributed by machines of any ordinary construction,) and also that of moving it over and into the orifices *o*, through which it passes into the distributing-tubes *t*.

For the purpose of causing the arms *r* to more thoroughly loosen and divide the mass of material to be sown, and of preventing their moving it from one end of the hopper toward the other, every alternate shaft to which they are fixed has an opposite motion—or, in other words, each one rotates in a direction opposite that of its immediate neighbour—produced by making the pinions *p* and *p′* mesh directly into each other without the intervention of other gearing. The effect of this opposite motion is to more thoroughly loosen and divide the mass, and at the same time keep it evenly diffused through the whole length of the hopper, which would not be the case if all the shafts revolved in the same direction. The opposite motions of the shafts may be given by other means than those I have described; but the direct action of the pinions upon each other is found to be the most convenient mode.

For the purpose of preventing the direct and too rapid flow or descent into the distributing-tubes of finely-pulverized substances in a very dry state—such as ashes, lime, plaster, charcoal, bone-dust, poudrette, and the like— a shelf or fender, *u*, is employed. This fender extends the whole length of the hopper *m*, and in its breadth from the back part of the hopper to the line of the vertical shafts, or thereabout covering, the outlet-orifices *o* at a height of about two inches above the bottom of the hopper. This height, however, as well as the width of the fender, may be varied according to circumstances.

When any of the dry finely-pulverized substances above enumerated are being sown, the fender *u* is let down to a horizontal position. It then retards and partially intercepts the flow or descent of the same to such an extent that but a small quantity passes into the tubes besides that which is moved into the orifices *o* by the combinations of the vertical shafts and radial arms above described, which I call the "distributers."

When damp guano or other cohesive substances are being sown, the fender is removed or thrown back into a vertical position, so as to allow the particles produced by the dividing and comminuting action of the distributers to pass freely through the orifices *o*.

One of the arms upon each of the shafts is placed at a proper height to sweep over the upper side of the fender, for the purpose of moving such portions of the material as are resting there. More than one arm sweeping thus above the fender may in some cases be found preferable.

The machine is drawn by means of a pole or shafts attached to the frame B.

The quantity sown may be regulated by slides partly covering the orifices *o*, or by changing the relative sizes of the toothed wheels.

The apparatus described, instead of being transported on and operated by a carriage specially adapted to it, may be placed upon and in connection with seed-sowers, and be operated by them, and the fertilizers sown by one and the seed sown by the other be passed through a set of tubes common to both.

The use of a series of distributers, as above described, presents many advantages. Were a single one only to be used to sow a number of rows at one time, it would be necessary to make the hopper as broad as it is long, thus increasing its capacity to a most inconvenient degree. Indeed it will not answer at all for one distributer to supply orifices at unequal radial distances, as the increased speed of the arms due to the increased distance from the center of rotation will entirely destroy all uniformity of distribution. Instead of making the arms unequal, the whole may be made of equal lengths; but the former is deemed preferable, as it requires less power to drive, and the arms for the various purposes for which they are used work quite as effectually as if they were all of the same length.

Having thus described my invention, what I claim as new, and desire to secure by Letters Patent, is—

The combination of two or more vertical shafts provided with arms with the outlet-tubes of a machine for sowing fertilizers, &c., the whole being constructed, arranged, and operated in the manner and for the purposes substantially as set forth.

WARREN S. BARTLE.

Witnesses:
CHAS. EVERETT,
C. H. SLICER.